(12) United States Patent
Murphy et al.

(10) Patent No.: US 7,173,691 B2
(45) Date of Patent: Feb. 6, 2007

(54) METHOD FOR CALIBRATING THE GEOMETRY OF A MULTI-AXIS METROLOGY SYSTEM

(75) Inventors: Paul Murphy, Rochester, NY (US); Jon Fleig, Rochester, NY (US); Greg Forbes, N. Epping Sydney (AU)

(73) Assignee: QED Technologies International, Inc., Aurora, IL (US)

( * ) Notice: Subject to any disclaimer, the term of this patent is extended or adjusted under 35 U.S.C. 154(b) by 375 days.

(21) Appl. No.: 10/743,840

(22) Filed: Dec. 22, 2003

(65) Prior Publication Data

US 2005/0134851 A1  Jun. 23, 2005

(51) Int. Cl.
*G01B 11/26* (2006.01)
(52) U.S. Cl. ...................................... 356/138
(58) Field of Classification Search ............... None
See application file for complete search history.

(56) References Cited

U.S. PATENT DOCUMENTS 3,826,011 A * 7/1974 D'Aniello ................ 33/642
4,840,490 A * 6/1989 Gabriel et al. ............ 356/622
5,926,781 A * 7/1999 Scott ......................... 702/151
6,401,349 B1 * 6/2002 Onyon ....................... 33/551

* cited by examiner

*Primary Examiner*—Michael P. Stafira
(74) *Attorney, Agent, or Firm*—Neal L. Slifkin; Robert C. Brown

(57) ABSTRACT

A method for calibrating and aligning a metrology system comprising a machine including multi-axis part-positioning means and a wavefront-measuring gauge embedded in the machine. The gauge is used in determining spatial relationships among the translational and rotational axes, between part surface coordinates and machine coordinates, and between machine coordinates embedded gauge coordinates; in calibrating various components of the machine and the embedded gauge; and in aligning itself to the machine. A complete method comprises the steps of coarsely aligning the machine rotary axes with their respective translational axes and setting nominal zero points for the rotary axes; aligning the embedded gauge mainframe to the machine axes; aligning the embedded gauge focal point onto a spindle axis; determining the spatial offsets between the rotary axes when so aligned; precisely aligning the machine rotary axes with their respective translational axes; and setting precise zero points for the rotary axes.

34 Claims, 11 Drawing Sheets

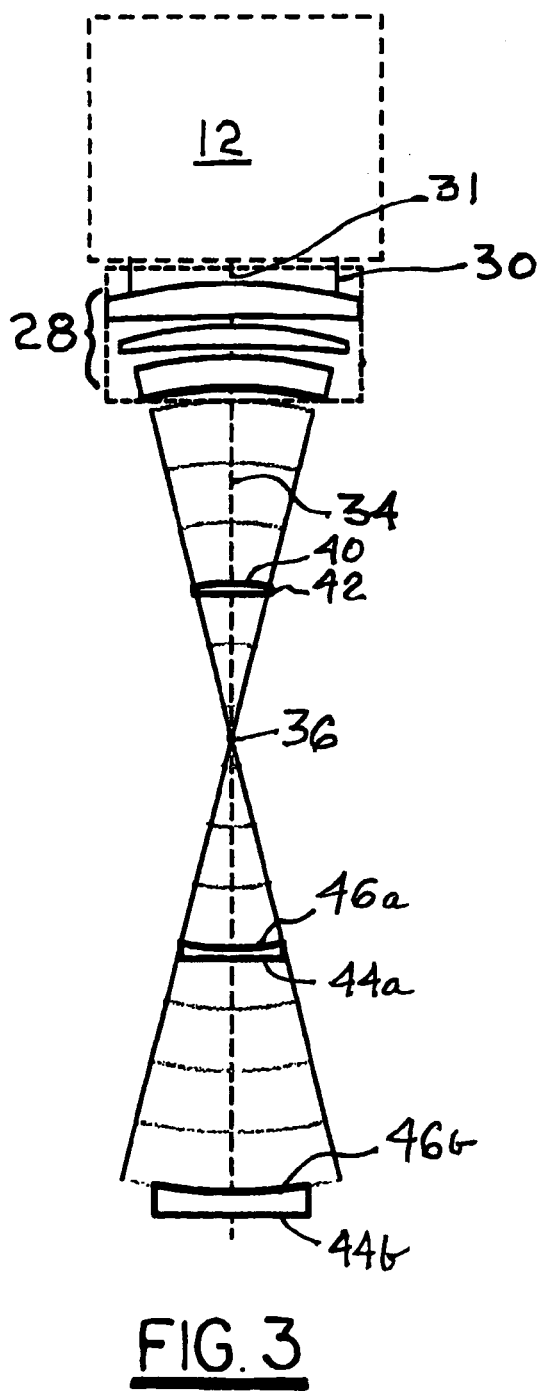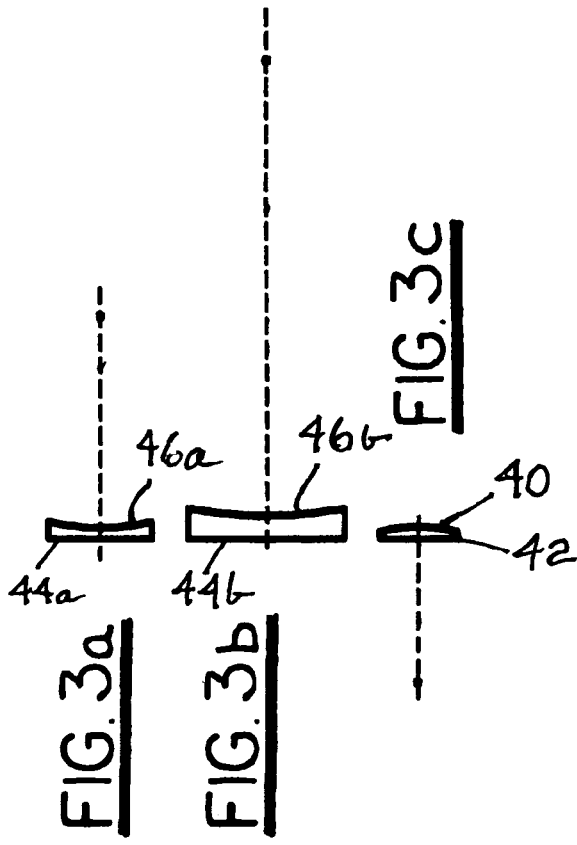

METHOD FOR CALIBRATING THE GEOMETRY OF A MULTI-AXIS METROLOGY SYSTEM

BACKGROUND OF THE INVENTION

1. Field of the Invention

The present invention relates to methods and apparatus for surface and wavefront metrology; more particularly to methods for measurement of surface locations with respect to machine motion axes and the measuring device; and most particularly, to a method for calibration of the geometry of an integrated metrology system comprising a multi-axis CNC mechanical positioning apparatus and an embedded wavefront-measuring gauge.

2. Discussion of the Related Art

In applications of single-point scanning measurement systems and machining, it is extremely important to achieve accurate positioning. Positioning errors in a sensitive direction translate into one-to-one cutting/measuring errors. As a result, considerable effort has been devoted to the manufacture of accurate positioning systems, methods for measuring such accuracies, as well as means for compensation of motion biases such as axis non-orthogonality. Such methods can include laser position measuring equipment on an external metrology frame. Micrometer level and better positioning accuracies can be achieved with such methods.

Such methods can be quite expensive, both in terms of machine design and cost of metrology equipment. They also often require a high degree of environmental control for best results. Furthermore, such methods are typically applied only to translational (X-Y-Z) motion. Spindles, when present in such a machine, are typically used for rotating a cutting tool at high speed, or rotating the part with respect to a cutting tool. Scanning measurement tools, such as profilometers and coordinate-measuring machines (CMMs), rarely have rotational axes. Those few that do are typically for azimuthal scanning of a nearly rotationally symmetric surface.

Wavefront-measuring gauges (such as a Fizeau interferometer or Hartmann-Shack wavefront sensor), however, operate in a different paradigm from that of machine tools and scanning measurement apparatus. Such gauges acquire a plurality of measurement points on a surface—often the entire test surface—as opposed to a single localized point that is scanned along the test surface. As a result, the part positioning and stage alignment requirements needed in wavefront measuring gauges is comparatively crude.

Wavefront-measuring gauges commonly have much less longitudinal measurement range than a profiling instrument. As a result, the part must be positioned more precisely than for a profiler, and often require tilting motions that profilers do not. Accuracy of the motions, however, is not important as the wavefront measuring device provides its own feedback as to the part's relative position to the gauge. Also, data acquisition time for a wavefront-measuring gauge is short compared to a profiler: seconds, or even faster, as compared to minutes and longer. The long-term absolute stability of the part and measurement gauge is thus less important for wavefront-measuring gauges. Another key difference is that profilers require motion during the measurement acquisition.

To summarize, profilers and high-precision CNC machining centers typically require dynamic motion with high accuracy on three translational axes. Wavefront-measuring gauges typically require tilt positioning for the part, but lack the high accuracy and dynamic requirements.

Accurate positioning in a metrology system comprising a wavefront-measuring gauge and mechanical positioning apparatus, though not necessary for general use, does have several applications. Some examples include calibration methods that employ multiple part motions, measurement of a part or system at an angle with respect to the wavefront-measuring gauge, and subaperture stitching of multiple measurements taken at different positions on a test surface.

Such applications require more accurate motion than a "usual" system. It is known in the prior art to apply methods used for profilers and high precision machining to align and calibrate translational axes of motion by use of indicator gauges, laser displacement gauges, and other such means. Such calibration, however, can be quite expensive and time-consuming, and is not readily applicable to the rotary axes necessary for a wavefront-measuring metrology system. Furthermore, such methods reveal nothing about centration of the embedded gauge with respect to the mechanical axes and stage, particularly the rotary axes. It is known to measure part wedge/taper and centration, or to eliminate it with respect to a spindle axes via manual alignment or shimming, but this requires additional equipment and/or tedious steps.

What is needed is a method for calibration of the geometry of an integrated metrology system using the wave-front measuring gauge embedded in the complete system.

What is further needed is a method for locating a specified part surface coordinate to a specified embedded gauge coordinate.

What is further needed is a method for measuring wedge and/or decentration of a mounted part with respect to a spindle axis.

It is a primary objective of the present invention to measure the geometric relationships in a complete metrology system between a wave-front measuring gauge, a test part surface, and mechanical axes to the accuracy necessary for a wavefront measurement.

It is a further objective of the present invention to calibrate and align the metrology system in preparation for moving a test part surface such that a specified part surface coordinate is located to a specified embedded gauge coordinate without any additional expensive metrology equipment, inbuilt metrology systems, or time-consuming alignments.

It is a still further objective of the present invention to measure the wedge and/or decentration of a part with respect to a spindle axis, further enabling precision centration of the part.

SUMMARY OF THE INVENTION

Briefly described, the present invention provides a method for calibrating and aligning a metrology system comprising a machine including multi-axis part-positioning means and an embedded wavefront-measuring gauge. The gauge is an integral element in determining accurately the spatial relationships among the translational and rotational axes, between the part surface coordinates and the machine coordinates, and between the machine coordinates and the embedded gauge coordinates; in calibrating various components of the machine and the embedded gauge; and in aligning the gauge to the machine. Such overall alignment can be helpful in making supra-aperture surface characterizations of a test part by mathematical stitching of a plurality of overlapping sub-aperture measurements.

In broadest form, the method comprises the use of a wave-front measuring gauge embedded in a multi-axis part-positioning machine in an integrated metrology system to assist directly in the calibration and alignment of elements of the machine, the gauge, a test surface, and various combinations thereof.

An important use of the combined gauge and machine is in a spindle axis alignment procedure, referred to herein as a "part-on-mount" procedure, in which a test part is mounted on a stage or chuck on a spindle axis of the machine and is rotated on the spindle in the gauge wavefront to generate a plurality of X and Y measurements. These measurements are processed in order to determine the geometric relationships between the spindle, part surface, and embedded gauge. When spherical optics are employed in the gauge, as for measuring a spherical test surface, the spindle axis is thus aligned with the gauge focal point (gauge focus). When plano optics are employed in the gauge, as for measuring a plano test surface, the spindle axis is thus aligned with the direction of propagation of the gauge wavefront.

A complete method for calibrating and aligning all elements of a metrology system comprises the steps of:
a) coarsely aligning the machine rotary axes with their respective translational axes and setting nominal zero points for the rotary axes;
b) aligning the embedded gauge mainframe to the machine axes;
c) aligning the embedded gauge focal point onto the A rotational ("spindle") axis (parallel to the spindle axis for a collimated test; note that this step must be repeated any time the focusing element is changed);
d) determining the spatial offsets between the rotary axes, and the motor step size if not already known precisely, when so aligned; and
e) precisely aligning the machine rotary axes with their respective translational axes and setting precise zero points for the rotary axes using the embedded gauge.

BRIEF DESCRIPTION OF THE DRAWINGS

The foregoing and other objects, features, and advantages of the invention, as well as presently preferred embodiments thereof, will become more apparent from a reading of the following description in connection with the accompanying drawings in which:

FIG. 2b is a schematic isometric depiction of the offsets between the rotational axes shown in FIG. 2a;

FIG. 3 is a schematic diagram showing confocal/null positioning of various spherical test parts (FIGS. 3a–3c), wherein the test parts are positioned such that the nominal center of curvature of the test surface is closely matched to the center of the spherical wavefront emerging from the embedded gauge;

DETAILED DESCRIPTION OF THE INVENTION

Figure 1:
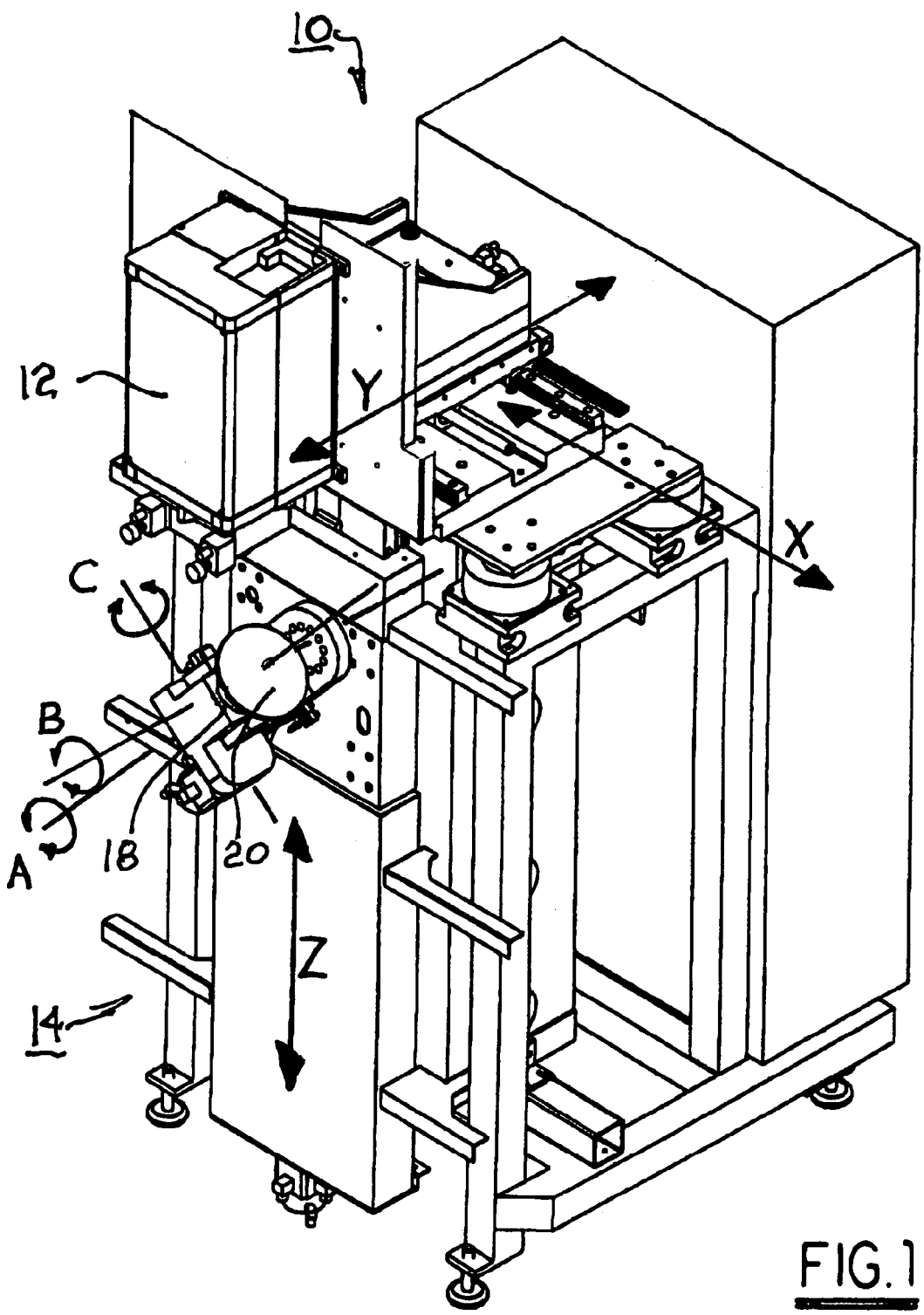
FIG. 1 is an isometric view of a multi-axis metrology system in accordance with the invention.
Figure 2A:
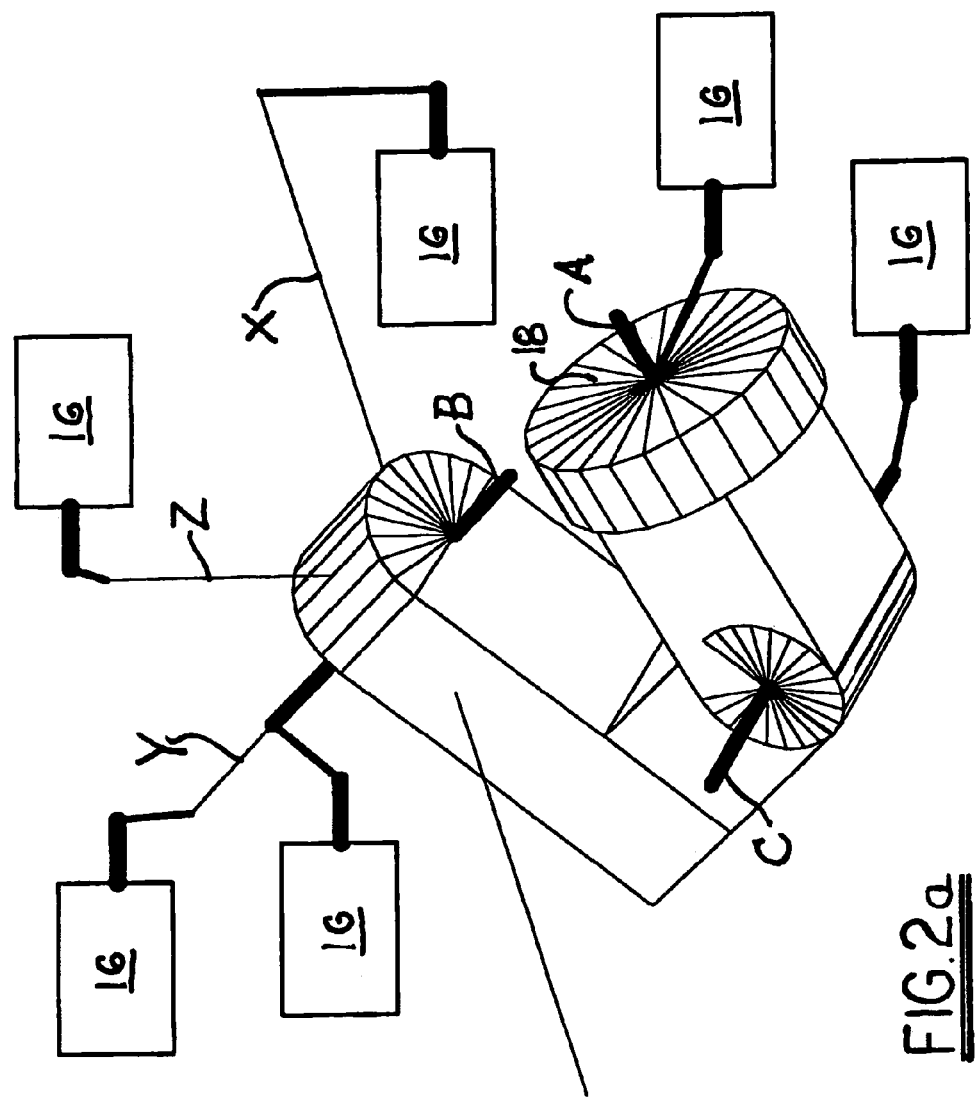
FIG. 2a is a schematic isometric depiction of the three translational axes and three rotational axes embodied in the instrument shown in FIG. 1.
Figure 2:
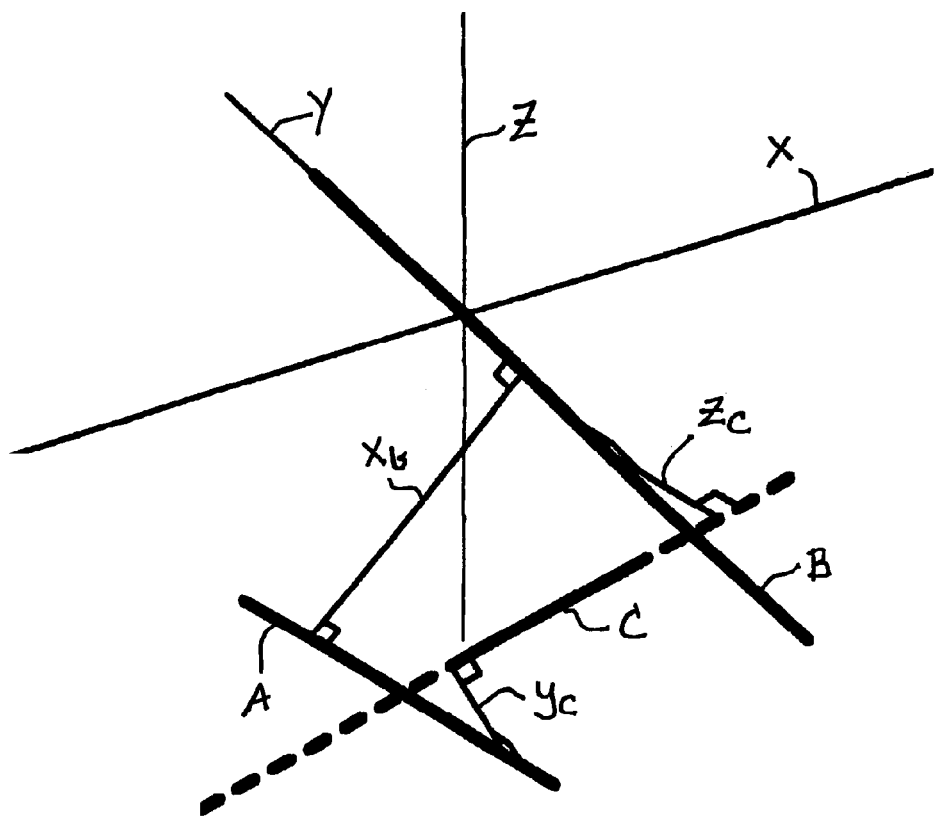
Figure 4:
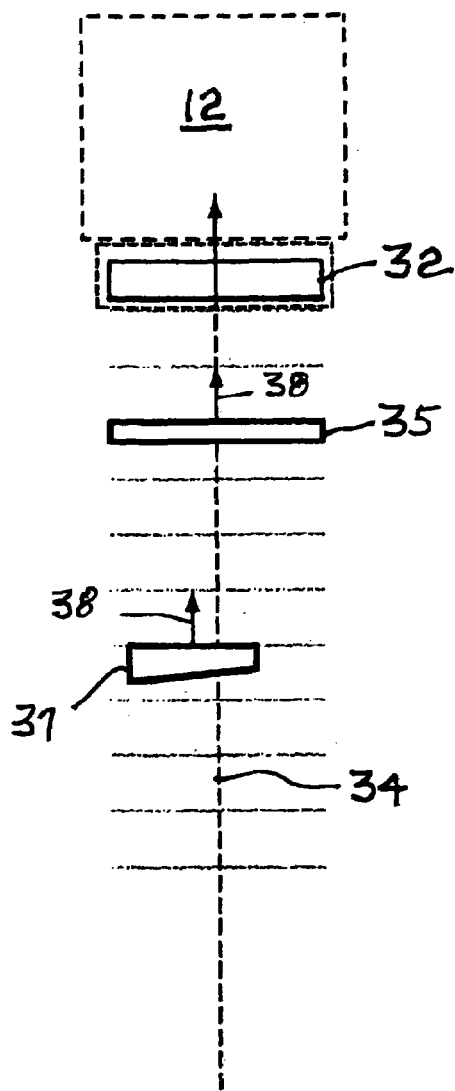
FIG. 4 is a schematic diagram showing positioning of various planar test parts (FIGS. 4a–4b) in a collimated optical field emitted by an embedded gauge, wherein the test parts are positioned such that the part surface normals are parallel with the direction of propagation of the field.
Figure 4A:
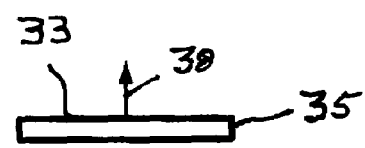
Figure 4B:

Referring to FIGS. 1 and 2, a metrology system 10 in accordance with the invention includes a wavefront gauge 12, for example, an interferometer, mounted to ("embedded" in) a multi-axis machine 14 defining a workstation having a stage 18 for receiving and moving a test part 20 during measurement thereof. A configuration of machine motions is shown (FIG. 2a) wherein there are six mechanical axes; three for translation (X, Y, Z) and three for rotation (A, B, C). It should be understood that other configurations of axes (including a different number and/or ordering of the axes) are possible within the scope of this invention. Motion in each of these six axes is independently controllable by, for example, an actuator 16 such as a stepper motor assembly having conventional mounting and gearing. All of the mechanical axes may be under either automatic or manual control. The type of control is not an essential part of the process. The machine axes must position a test part such that the focus 36 of the embedded gauge wavefront nominally coincides with the center of curvature of any particular section of a non-planar test part surface (or in the case of a nominally planar part, the direction of propagation 34 of the gauge wavefront is to be nominally parallel to the test surface normal 38). This is referred to herein as the surface "confocal" and/or "null" position, as shown in FIG. 3 and discussed further below (FIG. 4 for a nominally flat test part).

In a currently preferred embodiment of a metrology system in accordance with the invention, a chuck or stage 18 for receiving a test part 20 defines a workstation surface generally orthogonal to axis A. Embedded gauge 12 is mounted for translation along the X and Y axes.

For purposes of the following discussion, it is assumed that X, Y, and Z motions are mutually orthogonal; that the B axis is parallel to Y motion; that the B and C axes are orthogonal; and that the A and C axes are orthogonal. For a high-quality machine platform, such as employed in a CNC machine, these assumptions are valid within the range of error necessary for micron-range surface topology. Further, a convention as used herein is that when B=0 and C=0, the A axis points along the Z axis. Z is not parallel to A at any other B and C position (except, of course, a 180° rotation thereof) Means for precisely aligning A with Z is discussed further below.

For most such multi-axis machines as provided, however, the positions of the rotational axes with respect to each other and to the translational axes are not necessarily known to an accuracy sufficient for taking measurements with the embedded measurement gauge, nor are the positions of B and C known that make A parallel with Z. Further, for the metrology instrument 10, embedded gauge 12 must be aligned to be approximately parallel with the workstation Z axis. Finally, the location in space of a test part 20 mounted on stage 18 must be characterized with respect to the workstation axes and the embedded gauge. These spatial relationships between the axes, the gauge, and the part under test must be quantified and either corrected or understood and compensated for by mathematical characterization in programming the motion of the test part during use of the apparatus.

It is an important aspect of the present invention that the embedded gauge 12 is employed in conjunction with the mechanical axes of the machine 14 in the methods disclosed below in order to obtain such a high degree of alignment and/or compensation for sufficiently accurate part positioning.

Referring now to FIGS. 3 through 7, an important element of a method in accordance with the invention is the determination of the position of a stage-mounted test part 20 (recall FIG. 1) with respect to the A-axis and to the embedded gauge 12 (and/or gauge elements 28 or 32), which method element is referred to herein as a "part-on-mount" procedure. The test part may have a nominally flat surface, such as surface 33 on part 35, or may have a nominally flat surface but be wedged, such as part 37, or may have a nominally spherical surface such as convex surface 40 on part 42 or concave surfaces 46a,46b on parts 44a,44b, respectively (FIGS. 3a–3c and 8a–8c). (Note that aspherical surfaces may be nominally spherical over a sufficiently small aperture.)

Figure 5A:
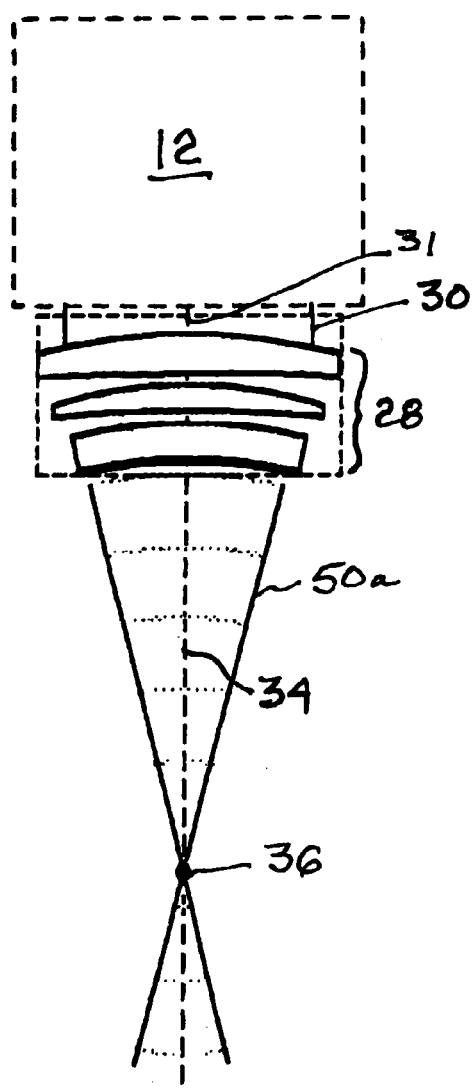
FIGS. 5a–5e are schematic diagrams showing stackable components of measurement systems in accordance with the invention, including 5a) a spherical gauge focusing element disposed in an embedded gauge (for example: a transmission sphere in the case where the embedded gauge is a Fizeau interferometer); 5b) spindle axis A fixed on a stage rotatable about axis B; 5c) a transmission flat disposed in an embedded gauge; 5d) a spherical test part disposed in some arbitrary position on a mount; and 5e a flat test part having wedge and disposed on a mount.
Figure 5B:
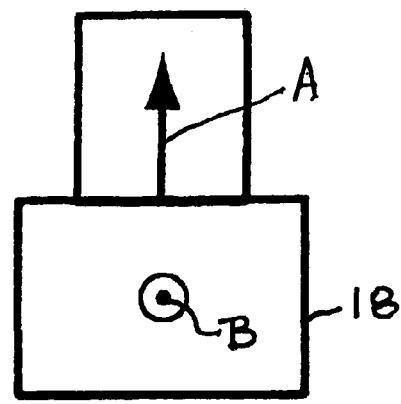
Figure 5C:
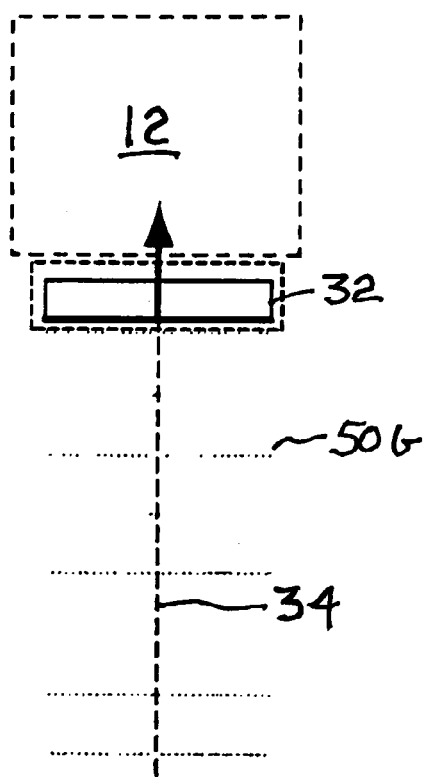
Figure 5E:
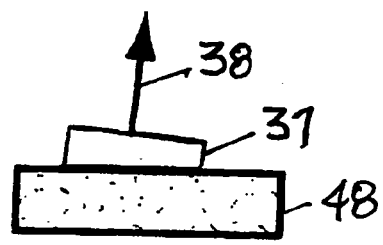
Figure 5D:
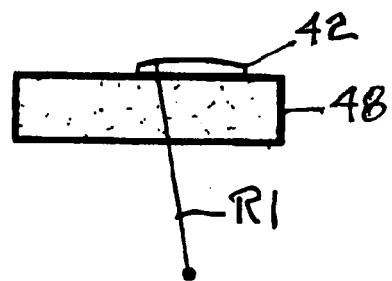
Figure 6A:
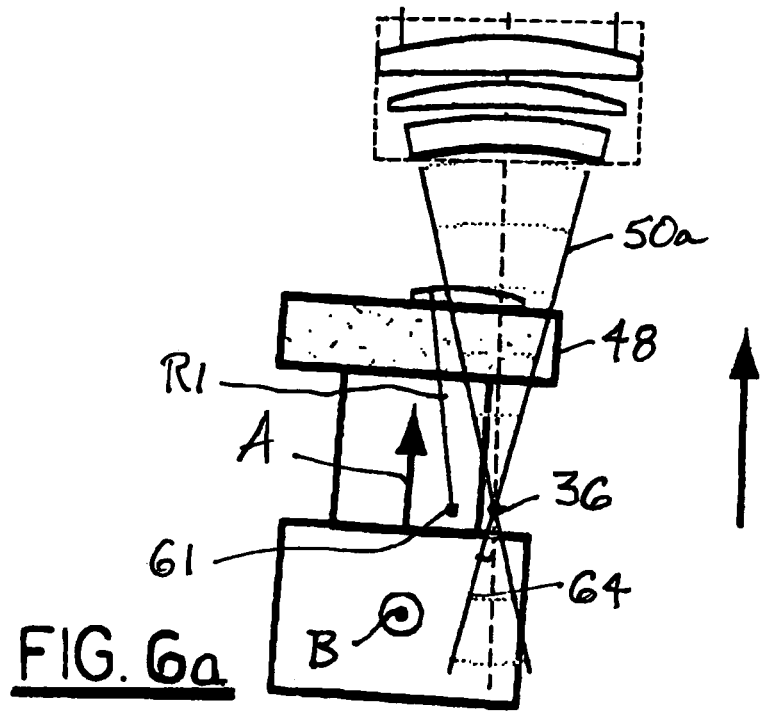
FIG. 6a is a schematic diagram showing the spherical test part and mount from FIG. 5d disposed on spindle axis A for rotation about axis B as shown in FIG. 5b, the assembly being disposed within the measurement range of the embedded gauge shown in FIG. 5a for measuring spherical parts.
Figure 7:
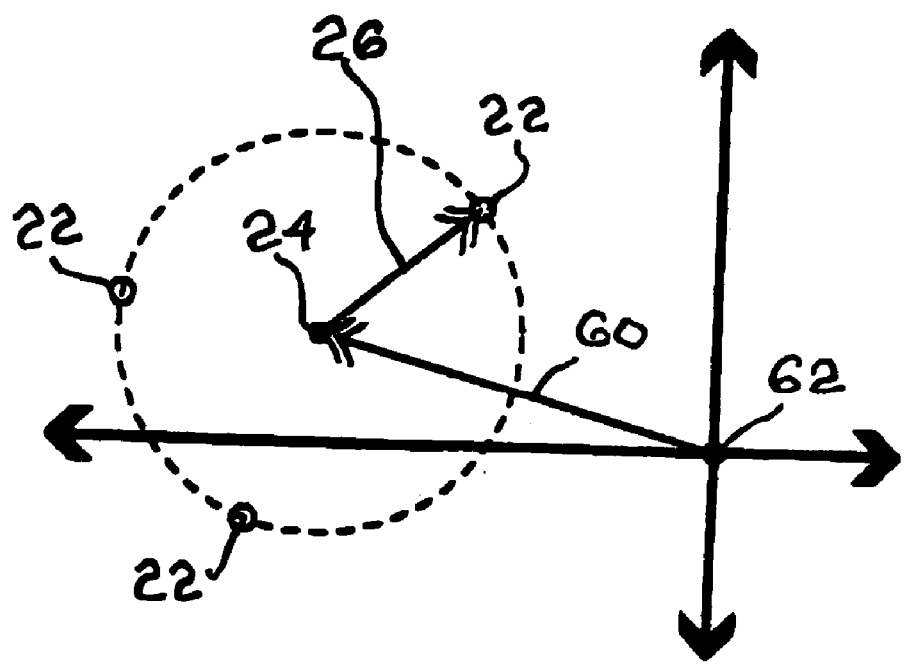
FIG. 7 is a schematic plot showing a method for determining the distance between the part's nominal center of curvature, spindle axis A, and the gauge focus (or, in the case of the plano test part, the angle between the spindle axis, the part surface normal, and gauge normal)

This method comprises the steps of:
a) mating the part and its mount (as shown in FIG. 5d for a spherical part, or in FIG. 5e for a plano part) with a spindle/A-axis stage (as shown in FIG. 5b) in the wave-measuring field 50a (spherical) 50b (collimated) of embedded gauge 12 as shown in FIGS. 6a (sphere) and 6b (plano), respectively (typically, the part is previously affixed to a mount 48 for subsequent installation onto the stage or chuck);

b) acquiring a series of part measurements at different spindle (A axis) rotational positions (at least 2);
c) extracting the tilt component of each measurement to obtain a plurality of data points 22, as shown in FIG. 7;
d) fitting a circle to the tilt and spindle position data; and
e) determining the gauge-to-spindle and spindle-to-part misalignments from the center 60 and radius 26 vectors of the circle fit.

For the part measurements, only the values of tilt at each A axis position are needed. These can be obtained either by performing a planar fit to the embedded gauge measurement data (and recording the fit coefficients) or by iteratively re-positioning the axes and re-measuring the wavefront until the embedded gauge measures a negligible amount of tilt at that particular A position (recording the final axes positions).

After acquiring measurements at two (or more) different positions of the A (spindle) axis, the position of the part with respect to the embedded gauge and spindle axes can be computed. A circle (in an X tilt/Y tilt coordinate plane) is fitted to the collection of coordinate triplets 22 (A, X-tilt, Y-tilt), as shown in FIG. 7. (The case of three such triplets is shown here, although it should be recognized that only the X and Y tilts are actually plotted in FIG. 7). The fit parameters include the center and radius coordinates of the circle. The center 24, which when expressed as with respect to the gauge coordinate origin 62 becomes vector 60, represents the gauge-to-spindle misalignment. The radius of the circle, vector 26, represents the spindle-to-part misalignment (note that there are an infinity of radius vectors that could be drawn; the one chosen will correspond to a particular position of axis A).

For a spherical part, vector 60 (in FIG. 7) corresponds to the displacement between gauge focus 36 and spindle axis A in FIG. 6a. (Note that the 2D displacement cannot be exactly portrayed in the 2D plan view. The distance shown in FIG. 6a is the x component of the vector 60). Alternatively, it can be expressed as a misalignment angle by dividing by the radius of curvature R1 of the test surface and taking the arcsine. Vector 26 indicates the distance from the test surface center of curvature 61 to spindle axis A, which can be represented as an angle in a similar way.

Figure 6B:
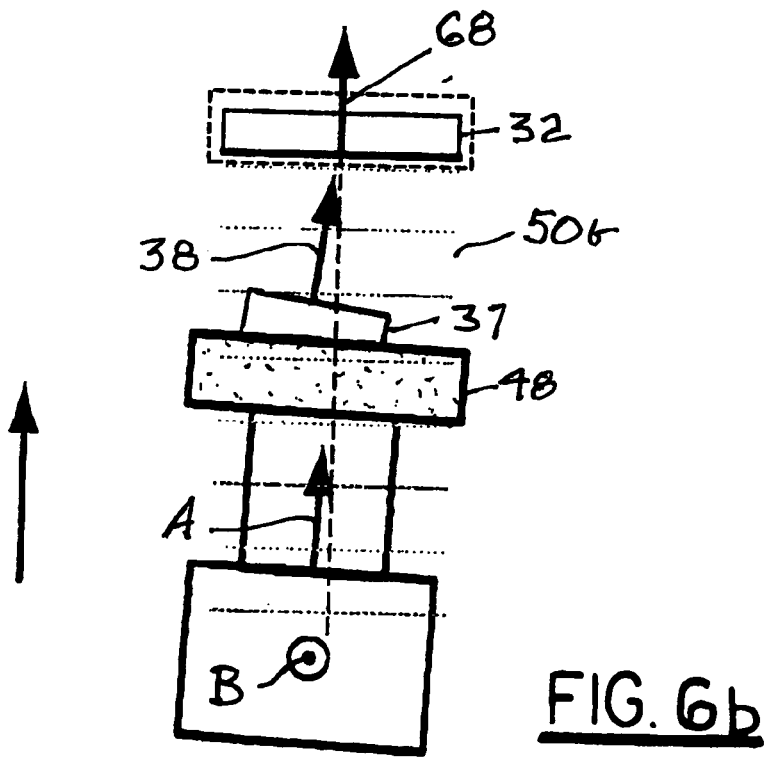
FIG. 6b is a schematic diagram showing the planar test part and mount from FIG. 5e disposed on spindle axis A for rotation about axis B as shown in FIG. 5b, the assembly being disposed within the measurement range of an embedded gauge configured for emission of a collimated optical field as shown in FIG. 5c.

For a plano part (in a collimated wavefront test), vector 60 corresponds to a displacement in angular (rather than lateral) coordinates, indicating the angle between the collimated wavefront normal 68 and spindle axis A in FIG. 6b. Vector 26 indicates the angle between the test surface normal 38 and spindle axis A.

Alternatively, if the gauge misalignment is assumed to be zero or some other known value, only one measurement is needed to estimate the part-spindle misalignment. The radius vector 26 of FIG. 7 is drawn from the assumed gauge misalignment value (the axes origin if the misalignment is assumed to be zero) to the single measured point, and is thus equal to the measured tilt at the particular A-axis position minus the value assumed for gauge misalignment. Naturally, the quality of this estimate of radius vector 26 is limited by the quality of the estimate of the spindle-to-gauge misalignment (radius vector 60). Although not as accurate as the multiple-rotation method described above, this method is very useful for providing an initial estimate of the misalignment, which estimate can be refined by the other method. This is of particular relevance when the tilt resulting from the part-to-spindle misalignment is large compared to the embedded gauge's range of tilt measurement capability. In such cases, the initial estimate allows the rotations needed for part-on-mount to be augmented by additional motions (based on the initial estimate of the part-spindle misalignment), thereby dramatically increasing the gauge's capability of acquiring a valid tilt measurement.

A first step in an overall method for calibrating the geometry of a multi-axis metrology system in accordance with the invention is to coarsely align A to be parallel with Z by setting the origins of the B and C axes, in known fashion as follows:

a) Mount a tooling pin (not shown) into the A spindle, and an indicator (not shown) off the rotary and Z axes (such that moving Z causes the pin to move with respect to the indicator). Ideally the pin should point directly along the A axis, but since the pin and/or spindle are imperfect in practice, rotate A to orient maximum pin deflection (with respect to A) in the YZ plane.

b) Adjust the indicator such that it measures X displacement of the pin.

c) Find the B origin by jogging Z and adjusting B until total indicated runout along the pin in Z is minimized.

d) Repeat for Y by rotating A 90° so that the maximum of the pin runout is oriented in the XZ plane. Reorient the indicator to measure Y displacement.

e) Find the C origin by again jogging Z and adjusting C until total indicated runout along Z is minimized.

The B and C rotary origins are now established and zeroed (B=0, C=0) and the A axis is now coarsely parallel with the Z axis within the limits of the mechanical means. More accurate alignment is achieved by using the embedded gauge 12 in accordance with the invention, as is disclosed in a later step.

A second step is to coarsely align the embedded gauge mainframe to the mechanical positioning system as follows:

a) Mount the gauge 12 on the machine platform 14, without a focusing element 28, such that a wavefront 30 having an internal optical axis 31 exits the gauge. The rotary axes should be as previously calibrated (B and C positions set such that the A axis is approximately parallel to the Z axis).

b) Mount an optical flat, such as part 35, as a test part on the A-axis spindle stage 18 and enter into "coarse alignment" mode on the embedded gauge (if available). Perform the above part-on-mount steps to determine the gauge to A axis misalignment. For this application, the part-on-mount procedure may be modified such that the measurements and the A axis motions may be performed in real time by an operator ("by eye", using the coarse alignment mode of the gauge) rather than in discrete move/acquire steps.

c) Tip and/or tilt the mounting bracket of the embedded gauge to eliminate the gauge misalignment term, thereby centering the circle image (not shown here, but appearing on the gauge control screen or reticle) onto the embedded gauge optical axis. The embedded gauge mainframe is now coarsely aligned with the workstation.

If the gauge is an interferometer, more precise alignment can be achieved by using a corner cube 80 with a partially reflecting front surface 81 for step b) above (instead of an optical flat such as part 35). In this case, the interference between the beam reflected from the surface 86 and the beam reflected from the corner cube 88 can be measured, which provides a precise estimate of the angle G between the interferometer mainframe 12 and the front surface normal 38. The reflected beam 88 from a properly fabricated corner cube 80 will be parallel to the incident beam 84. Likewise, the reflected wavefront 89 will be parallel to the incident wavefront 85. For an ordinary flat, however, the reflected beam 86 (or wavefront 87) is not in general parallel to the incident beam 84 (or wavefront 85). Instead, the angle between the reflected and incident beams is H, which is equal to two times angle of incidence G (the angle between incident beam 84 and surface normal 38). Therefore the interference between reflected wavefronts 87 and 89 provides a measurement of angle H and therefore angle G as well.

Since the angle G can be measured, it is possible to precisely adjust the alignment based on this measurement. Adjusting alignment of the interferometer mainframe 12 will change the orientation of incident beam 84 (and wavefront 85) and therefore angle of incidence G and measured angle H. Notice that the reflected beams 86 and 88 are only parallel when the angle of incidence G is exactly equal to zero (incident beam 84, surface normal 38, and reflected beams 86 and 88 are all parallel in this case). The interference will be "null" (minimum number of interference fringes) in this case.

If the front surface is perpendicular to the A axis, the interference between the front surface and retroreflected beams provides a direct measurement of interferometer's misalignment from the A axis. In this case, a "null" interference measurement indicates perfect alignment of the interferometer axis and the A axis. If the front surface is not perpendicular to the A-axis, a part-on-mount procedure can be used to separate the A-axis misalignment from errors due to the front surface not being orthogonal to the A-axis.

Note that if the coarse machine rotary origin is subsequently lost (after being obtained in step 1), one may perform a slightly modified version of step 2 instead of repeating steps 1 and 2. Simply adjust B and C instead of the tip and tilt of the gauge's mounting bracket (as in step 2) when minimizing the gauge misalignment term (which is really an "origin misalignment term" in this case). The coarse machine rotary origin has thus been recovered, and the gauge mainframe is still aligned to the workstation.

In some cases, an additional element, termed an "aperture converter", may be added after the gauge mainframe but before the focusing element. The function of the aperture converter is to obtain a different beam size by magnifying or demagnifying the beam (e.g. changing a 100 mm beam to a 25 mm beam). Aperture converters are usually afocal telescope assemblies (examples include in spyglasses, binoculars, and peepholes). The aperture converter can be aligned in the same manner as the mainframe, so that the beam angle emerging from the aperture converter is the same as that emerging from the gauge mainframe.

A third step is to finely align a focusing element 28 of the embedded gauge with the workstation by aligning the gauge with respect to the interferometer mainframe and obtaining the X & Y positions of the machine that cause the focus to lie on the A axis.

a) Mount a desired focusing element 28 onto the embedded gauge mainframe.

b) Align the focusing element to the internal gauge optical axis 31. (Note that axis 31 is actually BEHIND the transmission element in FIGS. 3 & 4. For example if the aforementioned alignment step were not performed, external axis 34 would be bent with respect to the internal gauge axis 31.) For example, in the case where the gauge is a Fizeau interferometer, this focusing element is a transmission sphere, and the alignment procedure is as follows:

i) Enter "align" mode on the interferometer. Note the alignment dot reflected on the interferometer reticle.

Visually center the dot on the reticle using tip-tilt controls for the transmission sphere. Next, establish fine alignment of the interferometer optical axis with the workstation A axis.

ii) Mount an optical flat 36 (preferably of known thickness) on the workstation spindle (A axis) stage. Jog the workstation Z axis until an interferometer catseye pattern appears, then null the catseye fringes using the transmission sphere tip/tilt controls. Record the Z position of the workstation at this position, which is the actual Z position of the focusing element's focal point in the machine's Z coordinate frame, minus the thickness of the optical flat.

iii) Remove the optical flat 36.

c) Locate the A axis onto the embedded gauge optical axis by mounting a test ball (or other nominally wedge-free test part, though in principle a large amount of wedge and/or decenter can be tolerated) onto the workstation spindle stage, and performing the part-on-mount sequence to locate the A axis position with respect to the gauge (radius vector 60 of FIG. 7, for example).

d) Move the stage (and thus the part as well) with respect to the embedded gauge employing only translational motion; i.e. the X, Y, and Z axes such that the gauge focus is coincident with the A axis. Record the X and Y positions; this is the nominal position of the gauge focus 36 which now intersects the A axis.

Note that for long radius focusing elements or diverging elements (where the point of convergence is behind the focusing element), steps b)ii) and b)iii) are not applicable. The resulting alignment therefore may not be as accurate. If, however, the gauge mainframe is an interferometer whose source has some spatial incoherence (and thus point 36 would not actually be a point but a region with some size and shape associated with it), then an alternative alignment procedure is possible. During step c) (above), the following procedure can be performed after mounting the test part but before performing the part-on-mount sequence.

i) Activate the interferometer mainframe's partial spatial coherence mode (if not already).

ii) Introduce many fringes of misalignment (using the X, Y and Z axes). Note that the alignment will be easier if a significant portion of these fringes come from Z (i.e. the fringes look like bullseyes).

iii) Ensure that the interferometer mainframe is significantly out of focus, adjusting any focus control as necessary.

iv) At this point, a modulation "envelope" should be visible over the fringe pattern. The exact shape of the envelope depends on the fringe pattern, source coherence, and degree to which the system has been misfocused. Estimate the center point of the envelope pattern and its distance from the center of the bullseye fringes.

v) Adjust the tip-tilt controls of the transmission sphere to make the center point of the envelope pattern and the center point of the bullseye fringes coincident.

vi) The transmission sphere is now more carefully aligned. The misalignment fringes and misfocusing may be corrected at this time.

The rest of the focusing element alignment procedure can be performed as normal.

In the case where a collimated test is desired, a plano element 32 is employed (rather than a focusing element 28), and the alignment procedure is somewhat different. Mount the transmission flat 32 in the interferometer. Enter "align" mode, and use the transmission element tip/tilt adjustments to center the alignment dot onto the gauge reticle. At this time, an optional step may be performed for an interferometer: switch to fringe viewing mode, mount a corner cube, and use the transmission element tip/tilt adjustments to minimize the X and Y tilt observed in the fringe pattern between the corner cube retroreflection and the transmission flat. Mount a test flat 35 (with an aperture smaller than the transmission flat aperture) onto the workstation spindle stage 18. Perform a slightly modified part-on-mount sequence: at each new A axis position, extract and record the X-Y coordinates of the part in the gauge coordinate system (for example the centroid of the valid measurement data) in addition to the tilt data. Process the tilt data as is standard for part-on-mount; this obtains the modified rotary origin (for flat motions). The centroid data are treated similarly as to FIG. 7, the key difference being that the axes of FIG. 7 are no longer tilt/decenter, but the extracted X-Y coordinates of the measurement at each A axis position. Fit the data to a circle and record the center of the circle. The center of this circle is the A axis position (center of rotation) in the embedded gauge's coordinate system.

A fourth step is to calibrate the CNC machine geometry by determining the spatial separations between the A, B, and C axes (see FIG. 1), the scale of the steps of motors 16, and the gauge focus position with respect to the machine (see FIG. 4). These constants can then be programmed into the CNC controller. Note that all of these values can, but need not, be computed with this procedure. For example, the motor step scale can often be achieved more accurately via other means, and a rotary axis with relatively small travel (e.g. if C, for example, had only a few degrees of travel range) does not need as accurate a calibration (so a less accurate method would be sufficient). Furthermore, once these values are computed, they need not be calibrated again (unless something drastic were to happen to the machine).

Referring to FIGS. 2a and 2b, machine constants to calibrate are:

a) the physical sizes of the step ticks of the stepper motors ($\delta_x, \delta_y, \delta_z$ mm/step), where $X=\xi\delta_x$; $Y=\eta\delta_y$; $Z=\zeta\delta_z$, and where ($\xi, \eta, \zeta$ are the axes positions in "motor step" units);

b) the offset between B and C in the Z direction ($z_c$);

c) the offset between A and B in the X direction ($x_b$);

d) the offset between A and C in the Y direction ($y_c$), the latter being not really necessary when C travel is limited; and e) the distance from B to the spindle face, which may be derived from B to the part's center of curvature distance ($z_F$) (see FIG. 6a) (not applicable for flat test parts), and requires knowledge of how the part sits on the spindle.

To calibrate the CNC machine geometry by determining the spatial separations between the A, B, and C axes (see FIGS. 1, 2a, and 2b), a) Mount a high numerical aperture, low wedge part in the spindle (i.e. a ball).

b) Move X and Y such that the A axis passes through gauge focus 36.

c) Orient any wedge in the part along the x-axis (rotate A until the fringes are vertical).

d) Find the confocal position (as shown in FIG. 3) using X, Y, Z (B and C should both be 0).

e) Repeat the following steps for several positions:

i) rotate B to some new value (e.g., a 5 degree increase);

ii) find the interference null using only X and Z;

iii) note any Y adjustment required to null, indicating that B is not normal to the X-Z plane;
iv) record the X, Z, B positions;

f) Minimize the expression below (via least-squares fitting, for example):

$$\varepsilon^2(P, Q, R, S) = \frac{1}{2(n+1)} \sum_{j=0}^{n} (\{\xi_j - P\cos(Bj) + Q[1 - \cos(Bj)] + R\sin(Bj)\}^2 + \{S\xi_j - R[1 - \cos(Bj)] + (P+Q)\sin(Bj)\}^2),$$

which assumes that nulls were acquired at (n+1) positions, and the fit parameters are P (part decenter), Q ($x_b/\delta_x$), R ($z_F/\delta_x$), and S ($\delta_z/\delta_x$). It is straightforward to modify steps e) and f), above, for the relationships between other rotary and translational axes (for example, yc would be obtained by C, Y, and Z motions and an analogous expression to minimize).

Figure 8A:
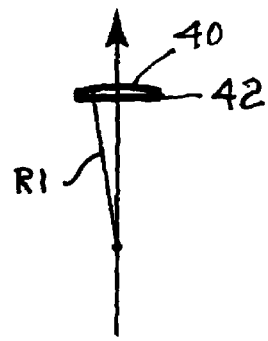
FIGS. 8a and 8b show a sample convex part (FIG. 8a) having a nominal radius of curvature R1, and a sample concave part (FIG. 8b) having a nominal radius of curvature R2, for illustrating alignment errors.
Figure 8C:
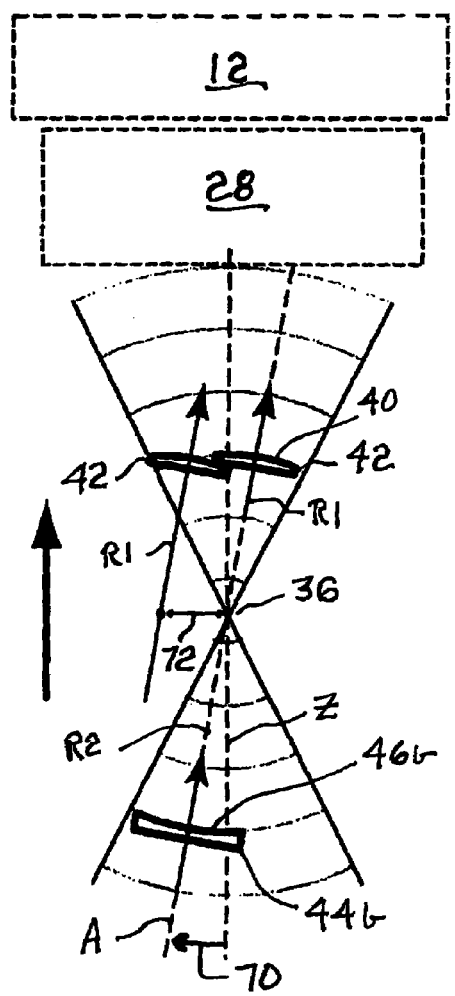
FIG. 8c is a schematic diagram showing the alignment errors introduced by axis A not being aligned with axis Z for the case of the sample parts shown in FIGS. 8a and 8b.
Figure 8B:
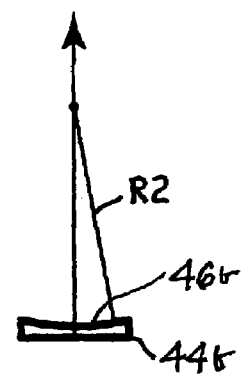
Figure 9A:
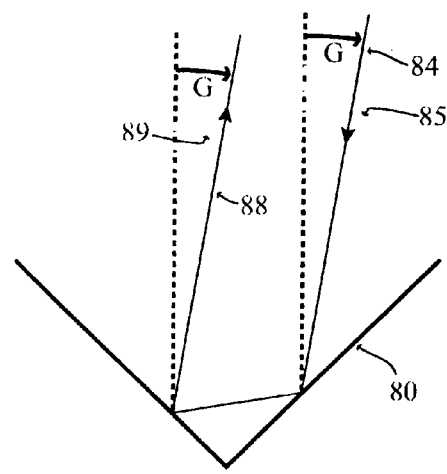
FIG. 9a is a 2 dimensional view of a retroreflecting mirror, which is made by joining 2 mirrors at a 90 degree angle (the 3 dimensional retroreflector includes 3 mirror faces); notice that the incident and reflected beams are parallel, regardless of incident angle.
Figure 9B:
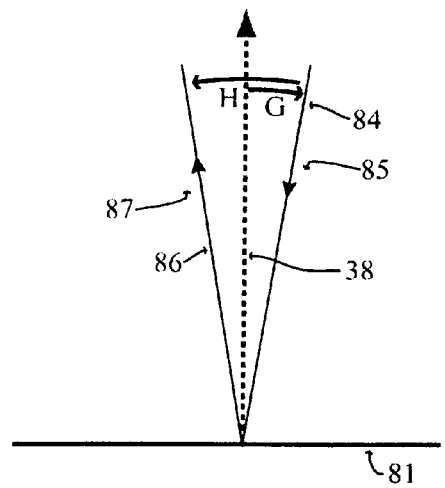
FIG. 9b illustrates reflection from a standard plane surface, where the angle of reflection is equal to the angle of incidence, and thus the incident and reflected beams are only parallel when the beam strikes at normal incidence.
Figure 9C:
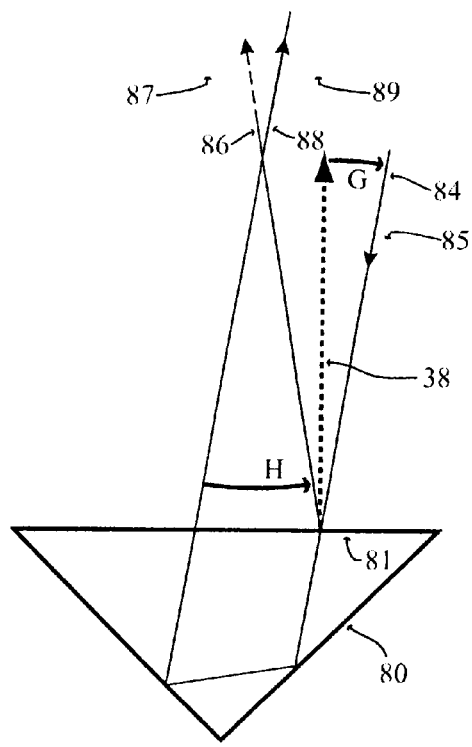
FIG. 9c shows the combination of a retroreflector and a partially reflecting planar surface (such as a corner cube), and the paths of light reflected from such an element.

Referring to FIG. 8, a fifth step is to obtain a more accurate alignment of the A and Z axes through use of the embedded gauge, rather than by solely mechanical means. This step requires testing at confocal at 2 or more different positions of stage 18 along the Z axis, preferably with the same focusing element 28. This can be achieved, for example, by the use of 2 or more spherical test parts with different radii of curvature, such as test parts 42 and 46. In principle, the same part could be used with different length mounts, but a large difference between the Z positions of the different confocal measurements is desired in order to maximize the precision of the A-Z angle measurement. One may use additional parts, and a least-squares fit, to obtain an estimate of the uncertainty in the A-Z misalignment angle value.

a) First, choose a convenient focusing element 28 (capable of measuring the available test parts).
b) Then perform a part-on-mount procedure on each test part in succession, recording the lateral gauge misalignment term (displacement 60 from A axis to gauge focus in x, y coordinates) for each part. FIG. 8c shows how an A-Z misalignment angle 70 can cause a significantly different spindle-to-gauge misalignment at different values of Z. Concave surface 44 on part 46 is shown in FIG. 8c in the case where X and Y of the system have been adjusted to have no spindle-gauge misalignment (for this particular case of Z, A-Z misalignment angle, and fixturing). That is, the spindle axis A intersects gauge focus 36. However, when the stage is moved up (in Z) for testing convex surface 44 on part 42 (keeping the relative X and Y positions fixed), the spindle-to-gauge misalignment 70 is shown to introduce a significant spindle-gauge misalignment at this new Z position, as shown by arrow 72 in the center of FIG. 8c. Note that the amount of this gauge-to-spindle error induced is equal to the tangent of the misalignment angle times the difference in Z between the two measurements. For simplicity, the part-to-spindle misalignment of parts 42 and 46 is shown to be zero in the illustration, and the error is only shown in the X direction (plan view), but these are not essential features of the process.
c) Perform a linear fit to the misalignment term in each dimension against Z position (i.e. X vs. Z and Y vs. Z); the slope of this line is the tangent of A-Z misalignment angle 70.
d) Adjust the B and C origins by this misalignment angle (to eliminate it).
e) Repeat the entire process to confirm the alignment and/or iterate to a more accurate alignment (the goal is no misalignment; i.e. the A axis is parallel to the Z axis to within the positioning precision of the machine). After this step is completed, the gauge mainframe may be realigned in accordance with the second step, if desired.

In accordance with the invention, the part-on-mount method is critical to performing a variety of machine and embedded gauge alignments without resorting to external metrology equipment and/or tedious mechanical methods. In addition, however, the method is also applicable to some other applications. For example, one of the calculated values obtained from the part-on-mount method is the wedge (and/or decenter for spheres) with respect to the spindle axis. Measuring, and in some cases minimizing, wedge and decentration is a useful endeavor in its own right (independent of machine and embedded gauge alignments). The method can be adapted to such applications in several ways.

For spheres, the part-on-mount method does not disambiguate tilt from decentration (due to the point symmetry of a spherical surface). Other methods, however, can be used to register the physical edge of the test part, thereby establishing a central axis independent from part-on-mount. Thus if either the centration or wedge of the test surface can be measured independently from the part-on-mount method, then part-on-mount can be employed to extract the other, unknown, value. For example, a part with a round edge (common in optical applications) may be centered with respect to the spindle using conventional mechanical methods (such as registering a mechanical indicator on the edge of the part, and iteratively spinning the spindle and tapping on the part until it is centered). Part-on-mount could then be performed, and would return the value of the part wedge (accuracy further limited to the quality of the centration), since decentration was eliminated prior to the part-on-mount process.

Similarly, so-called reversal methods can be employed in tandem with the part-on-mount method to separate the contributions of different error factors to the part-to-spindle misalignment. For example, if a part (nominally flat on both sides, but not necessarily parallel, such as part 37), were directly laid upon the spindle stage 18, the part-to-spindle misalignment term has two primary contributors: the angle between the front and back surfaces of part 37, and the angle between the spindle face normal and the spindle axis (i.e. non perpendicularity of the spindle face and/or intermediate part fixturing with the spindle axis). By rotating the part 180° with respect to the spindle (NOT by rotating the spindle 180°!) the error contribution is reversed. Performing part-on-mount in both of these configurations allows the part-to-stage and the stage-to-spindle axis misalignment components to be separated and independently determined from the spindle-to-part misalignment. The same reversal principles can be employed to separate error contributions measured by the part-on-mount technique from more complicated part and mounting configurations.

Of course such error separations are not limited to reversal methods. Any measurement technique that can isolate the misalignment contribution of a particular component can be applied. For example, the spindle face taper could be measured with a mechanical indicator. That result could be (vectorally) subtracted from a part-on-mount measurement of the aforementioned flat part in order to separate the angle between the front and back surfaces (wedge) of the test part from the spindle face. It is understood that the accuracy of such methods is limited to the degree with which the mounting is reproducible (kinematic).

The center of curvature of the part can be aligned to the spindle axis by using the embedded gauge instead of employing some mechanical method of indication. Mechanical means must be employed to adjust the part positioning, of course (via very gentle tapping of the part edge, for example), but the part-on-mount method can provide in situ measurements of part-to-spindle misalignment, thereby allowing such misalignment to be minimized.

It is understood that the accuracy of the programmed motion based on these calibration methods is limited by the quality of the underlying assumptions (e.g. axis orthogonality), and the uncertainty in the measurements that the calibration is derived from.

The calibration "lifetimes" of these steps are as follows: Steps 1 and 4 should only need to be performed once for a given machine, barring any major machine damage. Steps 2 and 5 are performed when an interferometer is first mounted in the system, or if the rotary axis origin (A parallel to Z) is lost (from a loss of step count on a stepper motor system, for example). Step 3 is performed whenever the focusing element is changed. Part-on-mount is performed whenever a part is mounted on the machine, and also as a sub-step of some of the other steps.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. In a metrology system including a part-positioning means having a spindle axis and a wavefront-measuring gauge, a part-on-mount method for determining the misalignment of a test part with respect to the spindle axis, and the misalignment of the spindle axis with respect to the wavefront-measuring gauge, the method comprising the steps of:
    a) mounting said test part onto said spindle axis such that a surface of said test part is exposed to said gauge;
    b) obtaining measurements of said test part surface with said gauge at a plurality of rotary positions of said spindle;
    c) extracting tilt components from said surface measurements at each of said rotary positions;
    d) fitting a circle to said tilt components and said rotary positions;
    e) determining the center of said circle with respect to said spindle to provide said gauge-to-spindle misalignment; and
    f) determining the radius coordinates of said circle with respect to said spindle to provide said spindle-to-part misalignment.

2. A method in accordance with claim 1 wherein said test part surface is selected from the group consisting of aspherical, spherical, and planar.

3. A method in accordance with claim 2 wherein said fitting step includes a least-squares approximation.

4. A method in accordance with claim 2 wherein said fitting step includes a visual inspection.

5. A method in accordance with claim 1 including the prior step of measuring wedge/decentration of said spherical test part with some other method, and the additional step of subtracting the value obtained from said spindle-to-part misalignment value to uniquely determining both wedge and decentration of said test part.

6. A method in accordance with claim 1, where the part-to-spindle interface includes one or more rotatable elements, each with its own contribution to the part-to-spindle misalignment, the method comprising the steps of:
    a) performing the steps of claim 1 to acquire a measurement of part-to-spindle misalignment at particular orientations of all rotatable components;
    b) rotating at least one of said rotatable elements by a known amount;
    c) performing the steps of claim 1 to measure the part-to-spindle misalignment at these new orientations of the rotatable elements;
    d) repeating steps b) and c) at least once for every extra rotatable component; and
    e) performing mathematical analysis on all the part-to-spindle misalignment values to extract the misalignment contribution of each individual rotatable element.

7. A method in accordance with claim 1 comprising the additional step of subtracting misalignment contributions from particular components in said part positioning means, in order to isolate the misalignment contribution from other components in said part-positioning means.

8. A method in accordance with claim 1 for aligning said test surface to said spindle axis wherein the position of said part is adjusted with respect to said spindle axis to minimize the spindle-to-part misalignment value.

9. In a metrology system including a part-positioning means having a spindle axis and a wavefront-measuring gauge, a part-on-mount method for determining the misalignment of a test part with respect to the spindle axis, assuming that the gauge-to-spindle misalignment values are known, the method comprising the steps of:
    a) mounting said test part onto said spindle axis such that a surface of said test part is exposed to said gauge;
    b) obtaining a measurement of said test part surface with said gauge at a rotary position of said spindle;
    c) extracting tilt components from said surface measurement; and
    d) subtracting said assumed known gauge-to-spindle misalignment values from said tilt components to determine said spindle-to-part misalignments.

10. A method for employing an embedded gauge and test surface to determine geometrical constants of a mechanical positioning system including X, Y, and Z translational axes and A, B, and C rotational axes, wherein such constants may include lateral scale of the translational axes, spatial separations between the rotary axes, and axial position of a gauge focus with respect to a machine stage, the method comprising the steps of:
    a) providing said embedded gauge with a focusing element;
    b) mounting a test part having a test surface on said machine stage;
    c) setting the positions of said rotary axes to zero;
    d) moving said stage along at least one of said X and Y axes such that said A axis passes through the focus of said gauge;
    e) adjusting said translational axes such that said test surface is confocal with said embedded gauge;
    f) moving a one of said rotary axes to a new value;
    g) repositioning said test part at said confocal position by adjusting said translational axes;
    h) recording the positions of axes that achieve said confocal condition;

i) repeating steps f) and g) for several different positions of said rotary axes; and j) performing a numerical fit to an analytical model of said machine geometry to provide said geometrical constants of said mechanical positioning system.

11. A method for aligning a wavefront-measuring gauge to a mechanical positioning system having a spindle axis, comprising the steps of:
   a) mounting said gauge, with focusing element removed, onto said mechanical positioning system;
   b) adjusting mechanical axes of said mechanical positioning system to a desired work origin position;
   c) placing a test part having at least one flat surface on said spindle;
   d) using said gauge to measure angular misalignment between said spindle (A) axis and said gauge; and
   e) re-orienting said gauge mainframe with respect to said mechanical positioning system, based on said angular misalignment measurement, to align said mainframe with said spindle axis.

12. A method in accordance with claim 11 wherein step d) includes a part-on-mount procedure.

13. A method for calibrating and aligning a metrology system including a multi-axis mechanical positioning system and an embedded wavefront-measuring gauge to determine accurately the spatial relationships among the translational and rotational axes of the system, the method comprising the steps of:
   a) coarsely aligning said mechanical positioning system rotary axes A, B, and C with said respective translational axes Z, Y, and X, and setting nominal zero points for said rotational axes;
   b) aligning the mainframe of said embedded gauge to said mechanical positioning system;
   c) aligning said embedded gauge onto said A rotational (spindle) axis;
   d) determining spatial offsets between said rotational axes when so aligned; and
   e) precisely aligning said machine rotational axes with said respective translational axes to set precise zero points for said rotational axes.

14. A method in accordance with claim 13 wherein step b) includes the following steps:
   a) selecting a focusing element;
   b) mounting said focusing element onto said embedded gauge mainframe;
   c) aligning said focusing element to the optical axis of said gauge mainframe;
   d) installing a test part having at least one curved surface on a spindle axis of said positioning system;
   e) determining any misalignment between said spindle and said gauge optical axis by using said gauge; and
   f) moving said test part along one or more translational axes of said mechanical positioning system to eliminate said misalignment.

15. A method in accordance with claim 14 wherein said focusing element is a transmission sphere and said embedded gauge is a Fizeau interferometer.

16. A method in accordance with claim 14 wherein said determining step includes a part-on-mount procedure.

17. A method in accordance with claim 13 wherein said embedded gauge generates a nominally collimated wavefront, and wherein step b) includes the following steps:
   a) mounting an optical flat in said collimated wave front;
   b) installing a test part having at least one flat surface on a spindle axis of said positioning system;
   c) determining any misalignment between said spindle axis and the direction of said wavefront collimation by using said gauge; and
   d) moving at least one rotary axis of said mechanical positioning system to eliminate said misalignment.

18. A method in accordance with claim 17 wherein said embedded gauge is a Fizeau interferometer.

19. A method in accordance with claim 17 wherein said determining step includes a part-on-mount procedure.

20. In a metrology system including a multi-axis positioning machine and an embedded wavefront-measuring gauge in collimated mode, a method for determining the lateral misalignment of a machine spindle axis with respect to said embedded gauge's coordinate system and the lateral misalignment of a test part with respect to said spindle axis, comprising the steps of:
   a) installing a test part having at least one flat surface on a spindle axis of said positioning machine exposed to said gauge wavefront, the aperture dimensions being fully contained in said gauge wavefront;
   b) measuring said part surface at a plurality of rotary positions of said spindle axis;
   c) extracting x-y coordinates in the gauge coordinate system from said measurements at each spindle position;
   d) fitting a circle to said x-y positions; and
   e) determining the center and radius coordinates of said circle to provide both said lateral misalignment of said spindle axis with respect to said embedded wavefront-measuring gauge coordinate system and said lateral misalignment of said test part with respect to said spindle axis, respectively.

21. In a metrology system including a wavefront-measuring gauge and part-positioning means having at least one rotational axis and at least one translational axis, a method for aligning said one rotational axis and said one translational axis by calculating the misalignment angle between them, comprising the steps of:
   a) mounting a test part on said one rotational axis;
   b) obtaining gauge measurements of the surface of said test part at a plurality of positions of said one rotational axis;
   c) performing repeatedly steps a) and b) at a plurality of different positions of said one translational axis using at least one spherical part mounted confocally at said plurality of translational axis positions to generate a plurality of terms representing misalignment between said gauge and said rotational axis in a plane perpendicular to said one rotational axis;
   d) fitting line to said plurality of gauge misalignment terms plotted versus position along said one translational axis; and
   e) calculating said misalignment angle of said one rotational axis from said one translational axis in said plane, equal to the arctangent of the slope of said line fit.

22. A method in accordance with claim 21 wherein step c) is performed using a plurality of spherical test parts having differing radii.

23. A method in accordance with claim 21 wherein step c) is performed using a single spherical test part provided with a plurality of mounts having differing thicknesses.

24. A method in accordance with claim 21 wherein said part positioning means includes one or more rotary axes that are not parallel to the said first rotary axis, including the further step of adjusting the origin of said additional rotary axes by said misalignment angle to reduce said misalignment.

25. A method in accordance with claim 24 wherein said misalignment measurement and adjustment steps are performed iteratively to minimize said misalignment.

26. In a metrology system in accordance with claim 21 wherein said part-positioning means include three translational axes, defined as X, Y, and Z, and three rotational axes, defined as A, B, and C, a method for precise measurement of the angle of misalignment between the A rotational axis and Z translational axis, comprising the steps of:
  a) performing repeatedly the steps of claim 21 on a plurality of different positions of said Z axis using at least one spherical part mounted confocally at said plurality of Z axis positions to generate a plurality of X and Y direction misalignment terms representing misalignment between said gauge and said A axis;
  b) fitting a line to said plurality of X and Y lateral gauge misalignment terms plotted against Z position; and
  c) calculating said A-Z misalignment angles in said X and Y directions in both said X and Y directions, equal to the arctangent of the slope of said line fit in each of said X and Y directions, respectively.

27. A method in accordance with claim 26 wherein said performing step includes the following part-on-mount steps to obtain said X and Y misalignment terms:
  a) mounting said test part onto said spindle axis such that a surface of said test part is exposed to said gauge;
  b) obtaining measurements of said test part surface with said gauge at a plurality of rotary positions of said spindle;
  c) extracting tilt components from said surface measurements at each of said rotary positions;
  d) fitting a circle to said tilt components and said rotary positions; and
  e) determining the center and radius coordinates of said circle to provide gauge-to-spindle and spindle-to-part misalignments, respectively.

28. A method in accordance with claim 26 including the further step of adjusting origins of said B and/or C rotary axes by said calculated misalignment angle to minimize said A-Z misalignment.

29. A method in accordance with claim 28 wherein said misalignment measurement and adjustment steps are performed iteratively to improve and/or validate said minimizing of said A-Z misalignment.

30. A method for aligning an interferometer aperture converter to a mechanical positioning system having a spindle axis, comprising the steps of:
  a) mounting said aperture converter onto said interferometer that is already mounted and aligned to said mechanical positioning system;
  b) adjusting mechanical axes of said mechanical positioning system to a desired work origin position, preferably the one where the interferometer (without aperture converter) is aligned to;
  c) placing a corner cube having a measurable front surface on said spindle;
  d) using said interferometer to measure angular misalignment between said spindle (A) axis and said interferometer with aperture converter attached; and
  e) re-orienting said aperture converter with respect to said interferometer mainframe, based on said angular misalignment measurement, to align said aperture converter on said interferometer mainframe with said spindle axis.

31. A method in accordance with claim 30 wherein step d) includes a part-on-mount procedure.

32. A method for aligning an interferometer aperture converter to a mechanical positioning system having a spindle axis, comprising the steps of:
  a) mounting said aperture converter onto said interferometer which has been previously mounted and aligned to said mechanical positioning system;
  b) adjusting mechanical axes of said mechanical positioning system to a desired work origin position wherein said interferometer (without aperture converter) is aligned thereto;
  c) placing a corner cube having a measurable front surface on said spindle;
  d) using said interferometer to measure angular misalignment between said spindle (A) axis and said interferometer with aperture converter attached; and
  e) re-orienting said aperture converter with respect to said interferometer mainframe, based on said angular misalignment measurement, to align said aperture converter on said interferometer mainframe with said spindle axis.

33. A method in accordance with claim 32 including a part-on-mount procedure.

34. A method for aligning a transmission sphere to an interferometer with partial spatial coherence, comprising the steps of:
  a) mounting and aligning a test part to, or near, its confocal position;
  b) introducing misalignment interference fringes with a distinct center (e.g. bull's eye fringe pattern), such as would be observed by moving the test part along the axis of the interferometer;
  c) changing the focus position of the interferometer as necessary to observe a modulation envelope over the interference fringes; and
  d) adjusting the tip/tilt of the transmission sphere to make the modulation envelope pattern and the fringe pattern concentric.

* * * * *